United States Patent [19]

Schulz et al.

[11] 4,226,916
[45] Oct. 7, 1980

[54] FORCE TRANSMITTING LOOP MADE OF FIBER COMPOSITE MATERIAL

[75] Inventors: Ralf-Thilo Schulz, Putzbrunn; Klaus Brunsch, Weidach; Rudolf Woerndle, Neubiberg, all of Fed. Rep. of Germany

[73] Assignee: Messerschmitt-Boelkow-Blohm Gesellschaft mit beschraenkter Haftung, Munich, Fed. Rep. of Germany

[21] Appl. No.: 929,278

[22] Filed: Jul. 31, 1978

[30] Foreign Application Priority Data

Aug. 11, 1977 [DE] Fed. Rep. of Germany ....... 2736124

[51] Int. Cl.³ .......................... B32B 9/04; B29H 9/02; F16G 11/00
[52] U.S. Cl. .................................. 428/542; 156/173; 156/174; 156/175; 156/180; 156/250; 403/213; 403/404; 428/358; 428/364
[58] Field of Search ............. 156/169, 175, 250, 180, 156/173, 174; 428/37, 542; 403/213, 206, 220, 291, 404

[56] References Cited
U.S. PATENT DOCUMENTS

| 2,505,104 | 4/1950 | D'Orio | 156/175 |
| 2,722,130 | 11/1955 | Caldwell | 156/194 |
| 2,987,217 | 6/1961 | Reed | 156/175 |
| 3,056,706 | 10/1962 | Knoppel | 156/169 |
| 3,288,481 | 1/1966 | Eldred | 156/169 |
| 3,943,020 | 3/1976 | Ashton et al. | 156/180 |
| 4,155,797 | 5/1979 | Schneider | 156/433 |

Primary Examiner—William R. Dixon, Jr.
Attorney, Agent, or Firm—W. G. Fasse; D. F. Gould

[57] ABSTRACT

A loop type force transmitting element is made of fiber composite or compound material. The force transmitting element has a predetermined cross-sectional shape and is open at one end. The cross-sectional area through the loop is constant along the length of the loop. However, the cross-sectional shape or configuration varies along the length of the loop. This type of structure is accomplished by machine winding the reinforcing fibers or filaments as an endless loop onto a winding core which has lateral walls spaced from each other so that the spacing corresponds to the wall thickness configuration along the length of the force transmitting element. One loop portion of the initially endless loop is severed after the composite material has been hardened whereby a loop element is formed which is open at one end.

11 Claims, 6 Drawing Figures

FORCE TRANSMITTING LOOP MADE OF FIBER COMPOSITE MATERIAL

BACKGROUND OF THE INVENTION

The invention relates to loop type force transmitting elements made of fiber composite material whereby the loops have a predetermined cross-sectional shape along their lengths. Particularly, the loop may be open at one end and has a constant cross-sectional area along at length but a variable cross-sectional configuration along its length.

Conventional force transmitting elements made of fiber composite material are wound by hand by applying the individual fibers manually around a core which corresponds in its shape to the inner contour of the force transmitting element. At least in the area of the force introduction, the fibers extend in the shape of a loop. Subsequent to the manual winding, the fiber bundle is formed or shaped into the cross-sectional configuration desired for the finished element. The so deformed element is held in this shape or position during the curing. This type of production results, especially in connection with loop elements having a cross-sectional shape which varies along the length of the element, in a nonuniform positioning of the individual fibers which is due to the type of manufacture. Thus, the individual fibers may cross each other at certain points and the fibers are loosely embedded in the fiber bundle without any orderly arrangement. Accordingly, the direction of the fibers in the finished element varies substantially from the stress direction at any local point along the element when the latter is subjected to a load. This variation diminishes substantially the load capacity or strengths of the force transmitting element in view of the anisotropic strengths and stiffness characteristics of fiber composite materials.

Another disadvantage of prior art force transmitting loop elements of fiber composite materials is seen in that their fibers located radially outwardly are loaded relatively little when the element is subject to a load, whereas the fibers located at the inner edge or wall of the element are subjected to high overloads. Such overloads are larger, the larger the ratio is between the outer radius and the inner radius in the looping zone of the force transmitting element. This characteristic of prior art force transmitting loop elements also substantially impairs their load bearing characteristics.

OBJECTS OF THE INVENTION

In view of the above, it is the aim of the invention to achieve the following objects, singly or in combination:

To construct a loop type force transmitting element of fiber composite material in which the fibers are arranged with due regard to the characteristics of the fibers as well as with due regard to the stress or tension loads to which these elements are subjected, while simultaneously taking into account the cross-sectional configuration which varies along the lengths of the element;

to avoid local overloads of the individual reinforcing fibers along the lengths of the force transmitting element as the latter is subjected to a load;

to locate the individual fibers during the winding thereof in such positions that these positions correspond to the load distribution in the finished force transmitting elements;

to minimize the quantity of material necessary for making such force transmitting elements thereby reducing their structural weight while simultaneously assuring that the finished elements are capable of transmitting high tension or pressure loads;

to make sure that the quality especially the performance characteristics are uniform from force transmitting element to any other force transmitting element of the same type;

to assure that the individual fibers are oriented along the lengths of the force transmitting element in the desired manner even if the element is open at one end thereof;

to construct the force transmitting element in such a manner that a biasing may be accomplished when the force transmitting element is in its built-in position;

to increase the fiber density while simultaneously removing excess synthetic material in which the fibers are embedded;

to increase the load capabilities of these force transmitting elements by at least 50% relative to comparable prior art force transmitting elements; and to avoid differential thermal lengths changes between the inner and outer fiber layers.

SUMMARY OF THE INVENTION

According to the invention there is provided a loop type force transmitting element which is characterized in that its reinforcing fibers are mechanically wound in the shape of an endless loop on a winding core which is provided with lateral walls spaced from each other at a spacing which corresponds to the wall thickness variation of the force transmitting element, whereby the lateral walls of the winding core confine the fiber bundle until after the curing or hardening is completed.

In a force transmitting element according to the invention the reinforcing fibers are properly oriented and positioned already during the winding operation whereby the winding mechanism is utilized for orderly positioning the reinforcing fibers in accordance with the load distribution in the finished force transmitting element. The position of the fibers corresponds to the load distribution in the finished element due to the fact that the winding tool also constitutes a shaping tool and comprises the winding core as well as the lateral walls which maintain the position of the fibers in a winding slot defined by the lateral walls of the core until after the element has hardened. Thus, a force transmitting loop element is produced which is free of localized faults in the fiber arrangement. Further, the resulting force element is capable of withstanding extremely high tension or pressure loads while simultaneously requiring a minimum quantity of material thereby also exhibiting a very low structural weight.

Furthermore, the mechanized winding in connection with the special winding and shaping tool substantially simplifies the manufacture and assures a uniformly high quality of the force transmitting elements according to the invention.

In order to assure the proper orientation of the individual fibers with due regard to the material and the load considerations even in a loop element which is open at one end, the invention teaches to initially form the loop as an endless loop which thus constitutes a double loop on the winding and forming tool. The double loop is then severed after the hardening by cutting off one loop portion of the double loop. Thus, a loop element is formed which is open at one end and which has been produced with the aid of a continuous mechanized winding operation which enforces a uniform, exact fiber arrangement.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
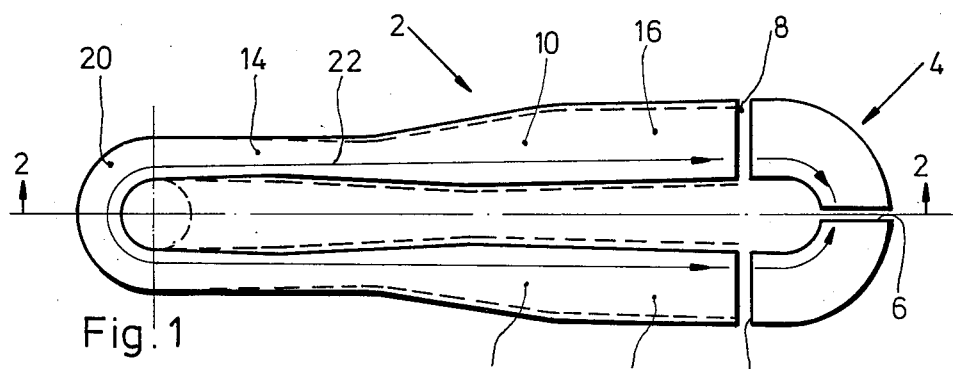
FIG. 1 is a somewhat schematic top plan view of a double loop subsequent to the severing of one loop portion to form a loop element which is open at one end, and a severed loop portion which was initially an integral component of the endless loop.
Figure 2:
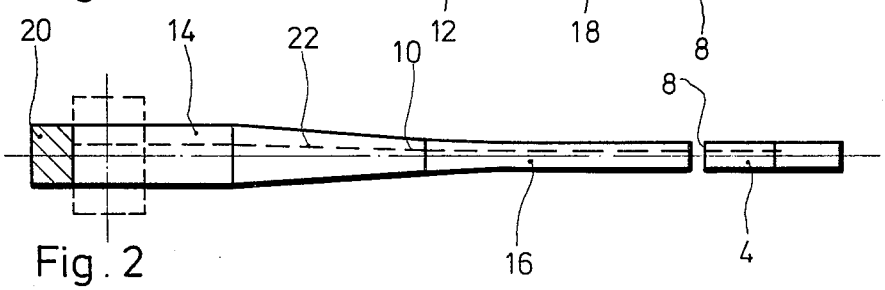
FIG. 2 is a side and elevational view of the double loop according to FIG. 1 along the section line 2—2.

FIGS. 1 and 2 show a single piece double loop 2 after it has been cured and removed from the winding and shaping tool. One loop portion 4 has been cut through in its crest area prior to the curing. The radial cut 6 extends entirely through the loop portion 4. The force transmitting loop is finished after severing the loop portion 4 from the longitudinal legs 10, 12 of the double loop 2 through the ends of said legs adjacent to the loop portion 4. The loop portion 4 is only required for the purpose of a high production quality. The finished force transmitting element 14 is open at one end and has a constant cross sectional area throughout its length. However, the cross sectional shape varies in the area of the longitudinal legs 10, 12. As shown, the width of the longitudinal legs 10, 12 diminishes from the widened leg ends 10, 18 toward the loop area 20. Adjacent to the loop area 20 the leg portions which are interconnected by the loop portion 20 have a constant cross sectional shape. The loop portion 20 also has a constant cross sectional shape. Corresponding to the diminishing width, the wall thickness of the loop element 14 increases in the central area of the longitudinal legs 10, 12, as shown in FIG. 2.

The loop element 14 including the severed loop portion 4 is made of fiber composite materials, for example, carbon fiber composite material with a uni-directional extension of the fibers. The fiber direction corresponds to the tension direction or to the pressure direction and is determined by the spacial shape of the loop element 14 as shown in FIGS. 1 and 2 for the single fiber or filament 22. The loop element 14 may, for example, be used for connecting a wing to the body of an aircraft. The loop is secured to a structural component in the area of its widened leg ends 16, 18, for example, by adhesive bonding, for instance, to the outer skin of a wing. The other force introduction point adjacent the loop end 20 is secured by a connecting bolt shown in FIGS. 1 and 2 by dashed lines. The connecting bolt cooperates with the inner edge of the loop end 20 for the introduction of tension loads. The bolt is secured to the other structural component such as an aircraft body by conventional means. However, the other force introduction point at the loop end 20 may be formed in addition to the just mentioned bolt or instead of the just mentioned bolt by hardware secured to the aircraft body constructed to support the loop element 14 at the outer edge of the loop end 20 in response to the pressure loads.

It can be shown that the fibers located at the inner edge of the loop element 14 are subject to larger loads than the fibers located radially further outwardly provided that the fibers extend uniformly in the tension direction and are arranged with due regard to the material as well as to the tension load. In order to avoid unpermissibly high tension load peaks at the radially inwardly located fibers, the free leg ends 16, 18 of the loop element 14 are installed with a spacing between these free leg ends 16, 18 which is reduced as compared to the unbiased condition. This reduced spacing is indicated in FIG. 1 by dashed lines. Thus, the radially outer fibers in their installed positions are biassed in the tension load direction, whereas the radially inner fibers are biassed in the pressure load direction. Due to this feature the load distribution in the individual fibers is made more uniform over the cross sectional width, whereby the load capacity of the loop element 14 is substantially increased according to the invention.

Figure 3:
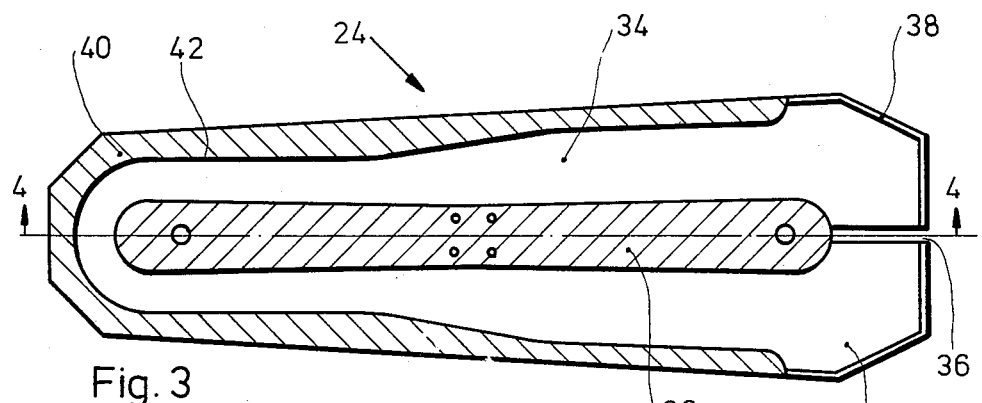
FIG. 3 is a sectional view through the winding and shaping tool including a shaping clamp which closes the shaping gap in the outward direction.
Figure 4:
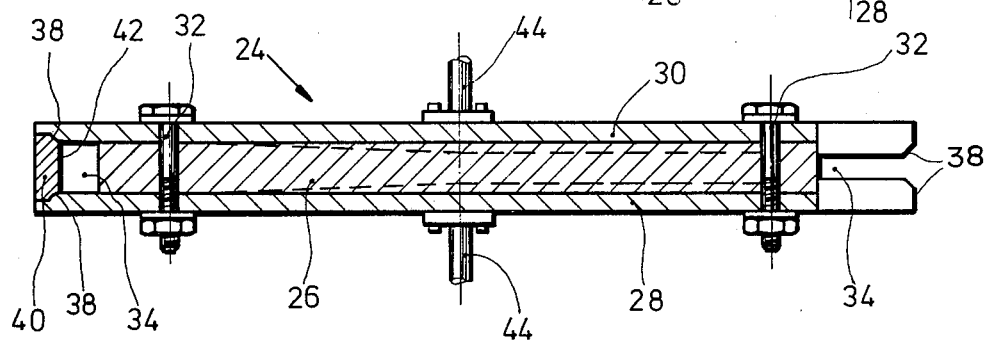
FIG. 4 is a sectional view along section line 4—4 of FIG. 3.

According to FIGS. 3 and 4 the winding and shaping tool 24 for the production of the single piece double loop 2, comprises a winding core 26 and two lateral walls 28 and 30. The outer contour of the winding core 26 corresponds to the inner contour of the double loop 2. The two lateral walls 28, 30 are secured to the respective side of the winding core 26. The side walls 28, 30 are spaced from each other in their zones which reach beyond the winding core 26 to such an extent that the spacing corresponds to the varying wall thickness of the double loop 2. The side walls 28, 30 are secured to the core 26, for example, by means of screws 32 in a releasable manner. Thus, in the assembled condition the side walls 28, 30 confine with their side surfaces facing each other together with the outer edge of the winding core 26 a shaping and winding groove 34 which corresponds to the spacial configuration of the double loop 2. As shown in FIGS. 3 and 4 a radial slot 36 extends through the right-hand end section of the side walls 28, 30. The radial slot 36 extends from the outer edge of the side walls 28, 30 to the outer edge of the winding core 26. A chamfer 38 runs along the outer edge of the side walls 28, 30 adjacent to the side surfaces facing each other. The chamfer runs around the entire circumferential length and facilitates the movement of the reinforcing fibers into the gap 34 during the winding operation. The tool 24 further comprises a clamp 40 which may be pushed from the outside onto the side walls 28 and 30. The clamp 40 is applied when the winding operation is completed and closes the gap 34 outwardly at least along a length corresponding to the shaping zone of the loop element 14. The clamp 40 is held in the proper position at the tool 24 by the chamfer 38. The inner edge 42 of the clamp 40 which closes the gap 34 corresponds to the desired outer contour of the double loop 2 or of the loop element 14. Two coaxial bearing studs 44 are secured approximately in the center of the shaping tool 24 at the outside of the side walls 28, 30. These coaxial bearing studs 44 support the tool 24 in a rotatable manner during the winding operation and the tool is driven through these bearing studs 44.

Figure 5:
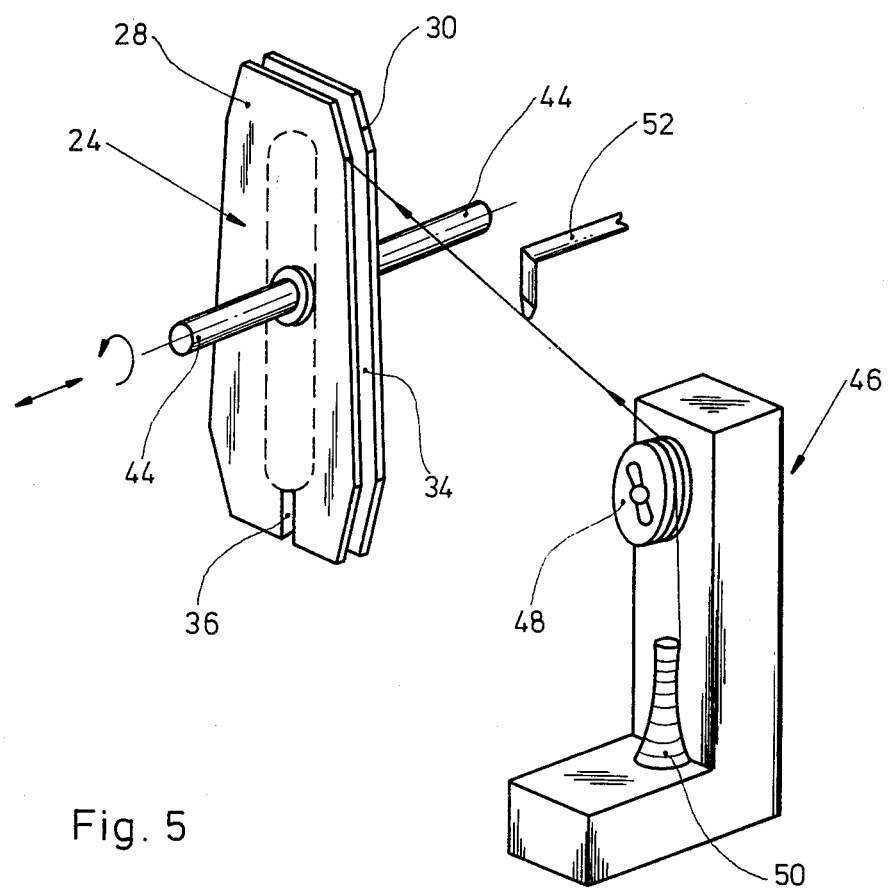
FIG. 5 is a schematic, perspective illustration of the winding operation by means of a winding mechanism constituting the tool also shown in FIG. 3 and 4.

During the winding operation the tool 24 is positioned with its bearing studs 44 in bearing support blocks not shown but which permit a rotation of the tool 24 about the bearing studs 44. Further, the bearing blocks permit a small back and forth shifting of the tool 24 in the direction of the axis formed by the bearing studs 44. As shown in FIG. 5 the winding mechanism further comprises a thread feed-in device 46 including an adjustable thread brake 48. An individual fiber constituting an endless thread is pulled off a supply spool 50 into the winding and shaping gap 34 with a predetermined pulling tension which may be varied during the winding operation if desired. For this purpose the tool 24 is rotated in the direction of the arrow as indicated in FIG. 5. In addition to the rotational movement, the tool 24 is moved back and forth in the direction of the axis defined by the bearing studs 44 as is customary during the winding operation. Thus, a fiber bundle constituting an endless loop in which the fibers extend unidirectionally, is formed in the winding gap 34. The loop is fixed in position by the outer contour of the winding core 26 and the lateral, inwardly facing surfaces of the side walls 28, 30 which also confine the winding gap 34. All the fibers of the bundle follow orderly the varying cross sectional shape of the winding gap 34. Further, the fibers are arranged substantially in the direction of the loads which are effective on the loop element.

The carbon fiber thread or filament is, for example, impregnated or soaked during the winding at a location between the supply device 46 and the winding tool 24, with a synthetic material such as an epoxy resin as shown schematically in FIG. 5, wherein the synthetic material is supplied through a nozzle 52. Upon completion of the winding operation the clamp 40 is pushed onto the tool 24, whereby the desired outer contour is impressed upon the fiber bundle, whereby the fibers may be densified and excess synthetic material may be squeezed out of the tool. Where it is desired to produce a loop element 14 as shown in FIGS. 1 and 2 which is open at one end, the fiber bundle is subsequently completely cut through along the radial slot 36 of the side walls 28, 30 in order to prevent unpermissible thread tensions if the tool 24 expands more than the carbon fibers during the subsequent curing. After the completion of the heat hardening or curing, the clamp 40 is removed and the finished double loop 2 is separated from the winding core 26 after the removal of the side walls 28, 30. Thereafter, the loop portion 4 is severed along the radial cuts 8 and the loop element 40 which is open at one end, is completed.

Figure 6:
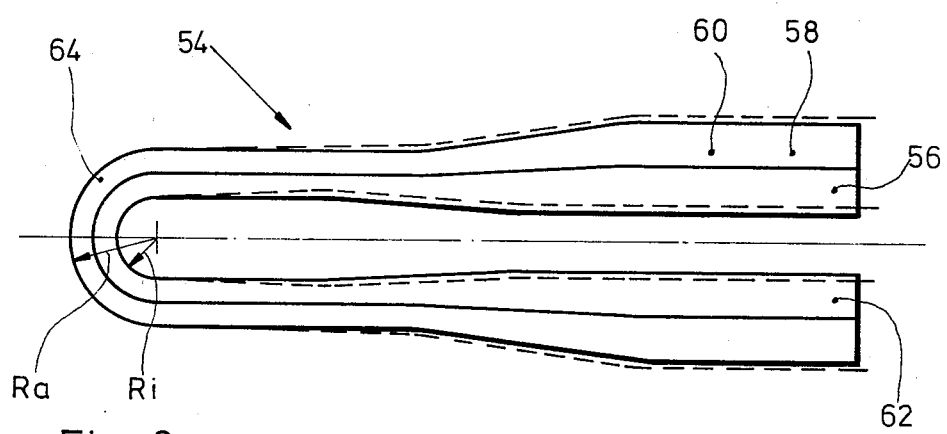
FIG. 6 is a schematic top plan view of a preferred embodiment of a loop element according to the invention which is open at one end or side thereof.

FIG. 6 shows a loop element 54 open at one end and of similar shape and equal construction as the loop element 14 of FIGS. 1 and 2. However, the loop element 54 is constructed of different types of fibers having differing modules of elasticity. The fiber layer 56 located radially inwardly has a lower module of elasticity than the fiber layer 58 located radially outwardly. The fiber layer 56 is, for example, made of glass fibers whereas the fiber layer 58 with the higher elasticity modulus is made, for example, of carbon fibers. Due to the larger elasticity of the inner fiber layer 56, the tension loads in the loop element 54 are substantially uniformly distributed over the cross sectional width. Thus, it is not necessary to install the loop element 54 under bias in order to prevent unpermissibly high tension load concentration at the inner loop edge.

The loop element 54 according to FIG. 6 is manufactured in the shape of a double loop in the manner elucidated above with reference to FIGS. 3 to 5. However, since the glass fibers have a substantially higher thermal expansion coefficient than the carbon fibers, different length changes are encountered in the fiber bundle itself during the curing due to the temperature variations. Hence, the inner and outer fiber layers 56, 58 exhibit different length changes. Accordingly, and taking into account the different heat expansion coefficients, the fiber bundle is cut through after the winding operation and prior to the curing. The cutting again takes place along the radial slot 36 of the lateral walls 28, 30. In addition, the winding core 26 is widened to provide for a so-called thermal tolerance as shown in dashed lines in FIG. 6. The widening extends beyond the inner contour of the finished loop element 54. Thus, if the glass fibers in the fiber layer 56 contract more than the carbon fibers in the fiber layer 58 during the cooling subsequent to the curing, and when the loop element 54 has been removed from the winding core 26, the longitudinal legs 60, 62 are spring biassed toward each other under the effect of the thermal tensions. The extent of the biassing corresponds to the thermal tolerance of the winding core 26, whereby the final spacing of the legs 60, 62 from each other corresponds to the predetermined finished dimension. The clamp 40 must also be widened in accordance with the changed outer contour of the winding core 26 laterally outwardly and in the direction of the right-hand tool end shown in FIGS. 3 and 4, so that the cross sectional variation of the shaping and winding gap 34 is being maintained. However, depending on the spacial shape of the loop elements it may be possible not to use the clamp 40 at all.

Due to the removal of the overloads at the radially inwardly located fibers under load conditions, the loop element according to the invention has a substantially increased strength while maintaining high stiffness values, whereby the inner glass fiber layer 56 preferably has a width equal to that of the outer carbon fiber layer 58, if, the ratio of the outer radius $R_a$ to the inner radius $R_i$ in the loop zones of the loop element 54 corresponds to about 1.6. It has been found that by these features a very advantageous increase of the load capacity of more than 50% has been achieved according to the invention compared to a loop element which is constructed entirely of but one fiber type.

In the light of the foregoing disclosure it is an advantage of the invention that it compensates for different heat expansions. Such different heat expansions may be caused, especially during the curing, between the winding on the one hand, and the shaping tool on the other hand, especially where several types of fibers are employed having different thermal expansion coefficients. The compensation is accomplished by a surprisingly simple device, namely, cutting through the loop portion which is later to be severed. The cutting is done subsequent to the winding but prior to the curing.

In order to bias the longitudinal legs 10, 12 slightly toward each other as shown in FIG. 1 by the dashed line, the force transmitting element is installed with a reduced spacing between its legs as compared to the unbiassed condition of these legs prior to the installation. This biassing force has the advantage that the fibers located radially outwardly are subjected to a biassing in the tension direction and the fibers located radially inwardly are subjected to a biassing in the pressure direction, whereby high tension peaks which otherwise occur under load conditions at the inner edge in the looping zones 20, are removed. As a result, the tension force is distributed still more uniformly over the entire cross-sectional width of the force transmitting element 14, especially where the force is introduced into the force transmitting element 14 by a bolt which is shown in dashed lines in FIGS. 1 and 2 located concentrically with the center of curvature of the looping zone 20.

In those instances where the force transmitting element is subjected to a pressure load in addition to the tension load or where it is subjected to a pressure load only it is advantageous to provide the necessary hardware which is arranged at the outer edge of the looping zone 20.

The above described clamp 40 which is applied after the winding operation is completed and which is held in position until after the curing, has the advantage that it closes the gap between the lateral walls of the winding core in the outward direction. In addition, the clamp impresses on the force transmitting element during the curing a predetermined outer contour. Thus, the fiber density is increased and any excess synthetic embedding material is squeezed out of the forming and shaping tool.

By using different fibers in one and the same loop so that the fibers located radially inwardly have a lower modulus of elasticity than the fibers located further outwardly, it is further possible to reduce, independently of the other features of the invention, in a simple manner, the steep load peaks which normally occur under load conditions at the inner edge of the force transmitting element. By assuring a much more uniform load distribution on all individual fibers substantially across the entire cross sectional area, the invention greatly increases the load bearing capacity of the present force transmitting elements. Thus, the outer fibers should preferably be carbon fibers, for example, whereas the fibers located further inwardly should preferably be glass fibers, for example, as mentioned above. In this connection, the width of each fiber layer should be approximately the same in the radial direction. In other words, each fiber layer takes up about one half of the total cross sectional width, particularly in the looping zone 20. This feature in combination with the above mentioned ratio of 1.6 between the outer and inner radius of the looping zone 20 resulted in an increased load capacity in excess of 50% as compared to prior art elements.

Different length variations caused by temperature fluctuations during the curing may be compensated by providing the winding tool with a shape which provides a thermal allowance or tolerance relative to the different thermal expansion coefficients of the individual fiber types. Specifically, the cross sectional shape of the winding core is modified in accordance with the individual different thermal expansion coefficient of the individual fiber types. Thus, when the element has been removed from the winding and shaping tool, it assumes the desired finished dimension since the fiber layer having the higher thermal expansion coefficient may contract freely while simultaneously thermal stress loads are removed.

Where the radially inwardly located fibers have a higher thermal expansion coefficient than the fibers located radially outwardly, it is possible that the loop element which is open at one end, will have legs which are biassed inwardly toward each other. In order to compensate for this biassing, the respective winding core may be shaped like a wedge with the wider end facing toward the severed loop portion. This is shown in dashed lines in FIG. 6. Thus, the dimensional change of the fiber layers is taken into account and after cooling the finished loop assumes the desired, predetermined dimension.

Although the invention has been described with reference to specific example embodiments, it will be appreciated, that it is intended, to cover all modifications and equivalents within the scope of the appended claims.

What is claimed is:

1. A force transmitting element of fiber composite material including reinforcing filaments embedded in a synthetic cured embedding material, comprising an open ended U-shaped member having a constant cross sectional area along the length of said open ended member and a cross-sectional configuration which varies along the length of said open ended member which is formed of an endless filament bundle initially wound onto a removable winding core means having a core proper and side wall means spaced from each other so that the spacing corresponds to said cross-sectional configuration which varies along the length of said open ended member having initially a closed loop form wherein after curing one end is removed by severing thereby forming said open ended U-shaped member.

2. The force transmitting element of claim 1, wherein said reinforcing filaments of said member are throughcut applied prior to the curing of said member.

3. The force transmitting element of claim 1, wherein said open ended element comprises longitudinal legs said longitudinal legs being biased toward each other in the built-in position of the force transmitting element whereby the spacing between said legs is smaller in said built-in position than prior to assuming said built-in position.

4. The force transmitting element of claim 1, further comprising a predetermined outer contour which is impressed on the radially outer filaments by applying clamp means after the winding and keeping the clamp means in position until the curing is completed, said clamp closing a gap between the lateral walls of the winding core.

5. The force transmitting element of claim 1, wherein the reinforcing filaments located radially inwardly of the U-shaped member have a lower modulus of elasticity than the reinforcing filaments located radially further outwardly.

6. The force transmitting element of claim 5, wherein the radially inner filaments are glass fibers and the radially outer filaments are carbon fibers.

7. The force transmitting element of claim 5 or 6, wherein the radial width of the inner filaments having the lower module of elasticity corresponds to about one-half of the entire cross-sectional width of the force transmitting element.

8. The force transmitting element of claim 1, wherein the winding core means comprises a cross sectional shape modified in accordance with the different heat expansion coefficients of the individual types of said reinforcing filaments.

9. The force transmitting element of claim 1, wherein the winding core means widens in the manner of a wedge in the direction toward the severed loop portion.

10. A method for forming a force transmitting element of fiber filament composite material in the form of an open ended member comprising the following steps: providing removable core means having a core proper and side walls, spacing said side walls from each other so that the space between the walls has a constant cross-sectional area along the length of the core means and a cross-sectional configuration which varies along the length of the core means, winding a fiber filament impregnated with a curable synthetic embedding material onto said core to form an endless loop, curing the synthetic embedding material, separating the endless loop from the core means, and severing said endless loop proximate one end to form said open ended U-shaped member, which has a constant cross-sectional area and a varying cross-sectional configuration along its length.

11. The method of claim 10, further comprising applying, after the winding but prior to the curing, a squeezing action to the fiber filament bundle on the core means, whereby the desired outer contour is impressed upon the fiber filament bundle and the fiber filaments are densified in the bundle.

* * * * *